Patented May 21, 1946

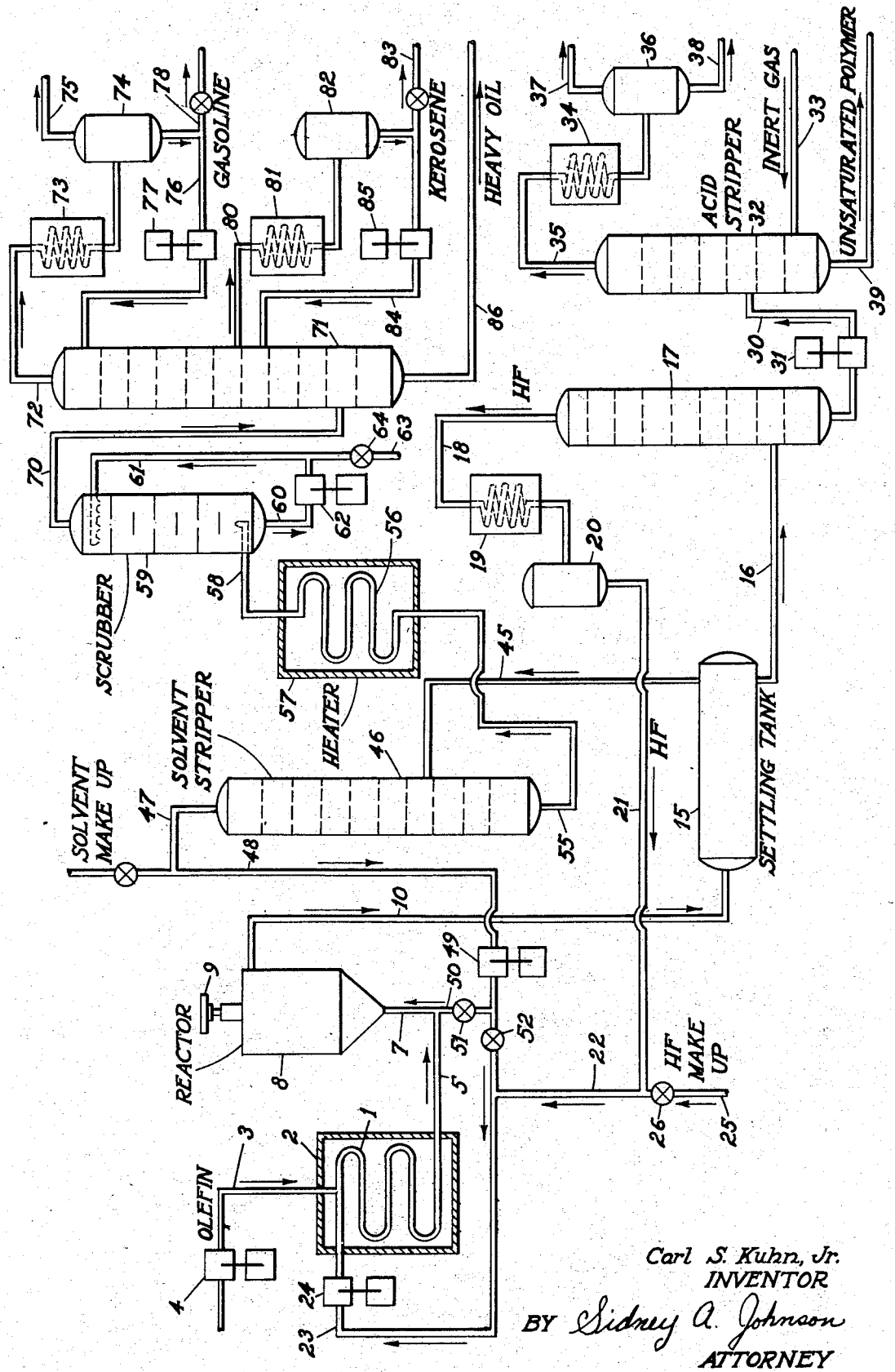

2,400,520

UNITED STATES PATENT OFFICE 2,400,520

POLYMERIZATION OF PROPYLENE

Carl S. Kuhn, Jr., Dallas, Tex., assignor, by mesne assignments, to Socony-Vacuum Oil Company, Incorporated, New York, N. Y., a corporation of New York Application April 24, 1944, Serial No. 532,489

8 Claims. (Cl. 260—683.15)

This invention relates to the catalytic polymerization of mono-olefins, particularly propylene, and is a continuation-in-part of my copending application Serial Number 403,876, filed July 24, 1941. More specifically, the invention is concerned with a particular type of polymerization of mono-olefins for the simultaneous production of an essentially saturated liquid hydrocarbon product and a highly unsaturated liquid hydrocarbon product.

In the past mono-olefins have been polymerized under both thermal and catalytic conditions. For instance, in the catalytic operations, such catalysts as dilute sulfuric acid, various metallic halides, etc., have been used. Usually the products of such reactions have been olefin polymers which are linear dimers, trimers, etc., of the original olefin reactant. It also is known that under suitable conditions, certain catalysts, such as concentrated sulfuric acid and aluminum chloride, can effect a different type of polymerization of mono-olefins, wherein there is obtained a top reactant layer consisting essentially of saturated liquid hydrocarbons and a bottom reactant layer which comprises terpene-like unsaturated hydrocarbons in combination with the catalyst. This latter type of polymerization apparently involves a hydrogen exchange between the primary polymerization products resulting in a saturation of one portion of the material at the expense of the other. For this reason the terms "hydro-polymerization," "dehydropolymerization," and "conjunct polymerization" have been applied to this complex reaction to distinguish it from the ordinary polymerization. Therefore, the concentration of the acid must be sufficient to give conjunct polymerization, and this lower limit is about 90% acid. For the purposes of defining my invention I shall consider anhydrous hydrogen fluoride as hydrofluoric acid. Accordingly, my catalyst is one consisting essentially of anhydrous hydrofluoric acid containing not more than 10% of water by weight on the basis of the hydrogen fluoride content of the catalyst although the titratable acidity of the catalyst in the reaction zone may be considerably less than 90% due to the presence of dissolved hydrocarbons and highly unsaturated polymer product, which of course reduce the titratable acidity as well as water.

When an olefin is admixed with essentially anhydrous hydrogen fluoride at least two predominant primary reactions are possible, i. e., addition of hydrogen fluoride to the double bond of the olefin monomer to form volatile alkyl fluorides, and polymerization of the olefin monomer induced or accelerated by the catalytic effect of the hydrogen fluoride to the olefin dimer, trimer, tetramer, etc. Where the reaction is carried out in the presence of a normal paraffin hydrocarbon solvent a third primary reaction is theoretically possible, i. e., combination of the normal paraffin with the olefin by an alkylation reaction. Which of these reactions is the predominant one depends upon the reaction conditions used, and the reaction conditions necessary to favor a particular reaction will in turn vary with the particular olefin utilized.

I have found that, in addition to the concentration of the catalyst, the temperature and the hydrofluoric acid to olefin monomer ratio exert an important effect in determining the nature of the reaction. Since my invention is concerned with the formation of the olefin polymers as a primary reaction product, the essential conditions will be considered from the standpoint of this reaction. As mentioned above, a substantially anhydrous hydrofluoric acid is an essential requirement. The ratio of hydrofluoric acid to olefin monomer must be high, at all times greater than 1 to 1 and preferably 5 or 10 to 1 or higher. In a large scale operation, particularly on a continuous basis, the preferred mode of operation is to add the olefin monomer to the catalyst-hydrocarbon mixture while agitating the mixture in the manner utilized in the present day conventional alkylation processes.

The effect of temperature varies widely with the particular olefin to be reacted. In the case of ethylene, increasing temperatures over the range of from $-15°$ C. to $+75°$ C. merely served to increase the amount of ethyl fluoride formed, and where the reaction rate of ethylene approached a reasonable value, the fluoride was the predominant product. Hydrofluoric acid alone seemed incapable of satisfactorily effecting the polymerization of this olefin. With propylene, the effect of temperature on the nature of the reaction was very sharp. In raising the temperature from $-5°$ C. to $+10°$ C., the reaction changes sharply from one of predominantly the formation of isopropyl fluoride, to one of almost entirely polymerization. The exact temperature at which isopropyl fluoride formation, as an end product, is largely eliminated varies about plus or minus $5°$ C. from $+10°$ C. with the hydrofluoric acid concentration and acid-olefin monomer ratio. On the other hand, with olefins of 4 or more carbon atoms, I have not been able to observe any appreciable formation of low boiling alkyl fluorides down to low temperatures at which the reaction rate becomes slow. For example at a temperature of $-20°$ C., polymerization is still the major reaction. Polymerization represents the chief reaction for propylene as well as the olefins of 4 or more carbon atoms through the ordinary as well as the moderately elevated temperature levels up to, say, $200°$ C., although temperatures between about $+10°$ and $+60°$ C. are preferred for propylene, and about $-20°$ and $+60°$ C. are preferred for olefins of 4 or more carbon atoms.

As mentioned previously, the acid to olefin monomer ratio is an important factor in securing the desired polymerization reaction. Since an important object of my invention is to secure not only a polymerization reaction, but to also recover the two types of product, i. e., the saturated hydrocarbons and the highly unsaturated, terpene-like products soluble in the catalyst, the relative proportions of acid to total hydrocarbons in the reaction zone is important. In the absence of inert solvents an amount of acid of from about 20% up to about 400% by weight of the olefinic hydrocarbons may be utilized, or expressed in another way from 25% to 500% by weight of olefins may be added to the hydrofluoric acid with separation possible into readily separable layers. Preferably the amount of olefins added is from 33⅓% to 200% by weight. Where inert solvents are utilized, the amount of olefin which may be added to the acid-hydrocarbon mixture will largely depend upon the relative proportion of acid and inert hydrocarbon solvent, and is normally within the range of from 16⅔% up to about 200% by weight of the amount of acid, with amounts from 25% to 150% by weight preferred. The difference in preferred ranges is due to the fact that the inert solvent does not react to produce larger molecules (which as a result of hydrogen exchange distribute themselves between the acid and hydrocarbon phases) but remains as a distinct hydrocarbon phase. Hence, assuming that the amount of solvent is at least as great as the amount of acid, the minimum amount of olefins necessarily added, where solvents are employed, is generally reduced by about one-half to obtain satisfactory conditions of layer separation. Similarly, especially where it is desirable to use relatively large amounts of inert solvent, the maximum amount of olefin which may be added to the catalyst with satisfactory separation after the reaction has been completed, is reduced.

The process may be carried out, in either the presence or absence of solvents, under conditions similar to those utilized in carrying out alkylation reactions, or the conditions used are what might be termed "alkylation conditions" with respect to pressure, temperature (within the ranges indicated), reaction system, mode of introduction of reactants and the like.

Since the reaction gives off a substantial amount of heat, it is usually desirable to provide suitable cooling means in order to maintain the temperature within the preferred limits. Usually the reaction will be carried out so that the hydrogen fluoride catalyst is in liquid phase, and, therefore, in such cases sufficient pressure should be provided to maintain the catalyst in liquid phase. However, such procedure requires only sufficient pressure to maintain the inert solvent, if any, and the hydrogen fluoride in the liquid state. The olefin is then passed through the well-agitated liquid at such a rate that it all reacts to higher-boiling hydrocarbons, wherefore no rise in pressure results. Accordingly, relatively low pressures can be used.

Since, in addition to the initial olefin polymerization, I desire to allow hydrogen exchange reactions to occur within the original polymer products, further contacting of the reaction mixture with the acid catalyst is desirable. The amount of residence time, of the hydrocarbon products in contact with the catalyst, required to achieve substantial or nearly complete saturation of the acid immiscible hydrocarbons varies with the reaction conditions and the particular olefin monomer being processed. At normal room temperature levels, total residence times of from 30 minutes to three hours are generally satisfactory, although these residence times are not intended as limiting on the operation of my process. The residence time is correlatable with the reaction temperature and the degree of saturation of the hydrocarbon layer products desired.

Referring to the drawing one possible form of carrying out the process of my invention is diagrammatically illustrated, which enables the continuous production of the conjunct polymer products. According to the form illustrated, the reaction is carried out in the presence of a normal paraffin hydrocarbon solvent.

To an emulsion of hydrofluoric acid and an inert solvent such as normal butane, obtained in the manner hereinafter described, in a coil 1 in temperature control zone 2, an olefin is introduced through line 3 provided with a suitable pump 4. The contact time of the olefin charge with the acid catalyst should be sufficiently long within the temperature control zone 2 so that a substantial portion of the olefin reacts therein to form the olefin dimers, trimers, etc. From coil 1, the olefin polymer, solvent-catalyst mixture is led through lines 5 and 7 to reactor 8 provided with a suitable agitator 9, wherein the emulsion is maintained for the desired residence time to permit the polymerization reactions to become completed and allow hydrogen exchange to occur between the olefin polymers as previously described. Product mixture is continuously withdrawn from the reactor 8, and sent through line 10 to settling tank 15 wherein the emulsion is allowed to stratify into an upper hydrocarbon phase and a lower acid catalyst phase. From the lower portion of the settling tank, catalyst phase is continuously withdrawn through line 16, and sent to fractionator 17, wherein the major portion of the hydrofluoric acid is distilled off from the highly unsaturated terpene-like polymers contained therein. The hydrofluoric acid vapors overhead from fractionator 17 are then sent through line 18 to condenser 19, collected in receiver 20, and returned through lines 21, 22 and 23 to reaction coil 1. Line 23 is provided with a suitable pump 24 to provide the necessary acid circulation. Make-up hydrofluoric acid is admitted, as necessary, to line 22 through line 25, provided with a control valve 26. The highly unsaturated polymer is removed from the bottom of the fractionator 17, and sent through line 30, provided with a suitable pump 31, to acid stripper 32. In acid stripper 32, the final traces of hydrofluoric acid are removed from the unsaturated polymer product by scrubbing the polymer with a hot inert gas such as nitrogen or methane introduced through line 33. This includes not only hydrofluoric acid present as such, but also hydrogen fluoride which may have added to double bonds in the unsaturated polymer and is driven off by moderate heating. The overhead from the stripper 32 is sent to condenser 34 through line 35, and any condensable material, principally hydrofluoric acid, collected in receiver 36, provided with a suitable vent 37, and recovered from line 38. Any hydrogen fluoride escaping with the vent gases may be recovered by any suitable means. The unsaturated polymer product is recovered from the bottom of the acid stripper through line 39.

The hydrocarbon phase is withdrawn from the top of settling tank 15, and sent through line 45 to solvent stripper 46. Solvent vapors are taken off overhead, sent to a suitable condenser (not shown) through line 47, collected in a receiver (not shown), and returned through line 48, provided with a suitable pump 49, to line 23, wherein the solvent is emulsified with the hydrofluoric acid recycle returning through line 22, and returned to reaction coil 1. A line 50 is provided, connecting lines 48 and 7, and control valves 51 and 52 are provided in lines 50 and 48, respectively, so that any desired portion of the recycle solvent may be returned only to reactor 8, rather than being emulsified with the acid recycle and sent through reaction coil 1. The bottoms from the solvent stripper are withdrawn through line 55, and sent to heating coil 56 in a suitable heater 57, wherein they are preheated to a temperature which will decompose the fluorides. Although the major portion of the hydrofluoric acid dissolved in the hydrocarbon layer and most of the readily decomposable organic fluorides, which may be formed in small amounts in the reaction, are removed from the hydrocarbons as hydrofluoric acid in the solvent stripper and returned to the reaction zone, some hydrofluoric acid or hydrofluoric acid forming compounds remain in the saturated hydrocarbon product. These fluorine compounds are removed by passing the preheated material from coil 56 through line 58 to scrubber 59, wherein the liquid is countercurrently scrubbed with an aqueous alkali solution. The scrubbing solution is removed from the bottom of the scrubber through line 60, and recirculated through line 61 by means of pump 62. The scrubbing solution may be withdrawn in part continuously, or from time to time, and fresh scrubbing medium supplied to line 61 through line 63, provided with a suitable control valve 64. The scrubbed hydrocarbon liquid is removed overhead through line 70, and sent to fractionating column 71 to be separated into the desired fractions. The overhead vapors in line 72 are sent to a condenser 73, and the liquid condensate recovered in receiver 74, provided with a suitable vent 75 for noncondensable gases. A portion of the condensate in receiver 74 is recycled through line 76, provided with a pump 77, to the upper portion of the column as reflux and the remainder withdrawn through valved line 78. This material consists of substantially saturated hydrocarbons boiling in the gasoline range. Vapors withdrawn from the center of the column through line 80, condensed in condenser 81, and collected in receiver 82, are largely kerosene boiling range saturated hydrocarbons and are drawn off for recovery through valved line 83. A portion of this kerosene boiling material may be returned to the column through line 84, by means of pump 85, as reflux. The material coming off the bottom of column through line 86 is a heavy predominantly saturated hydrocarbon material and can be further fractionated under vacuum if necessary to produce a valuable lubricating oil material.

Many modifications of the process illustrated will be readily apparent to those skilled in the art. For example vacuum stripping of the hydrofluoric acid from the unsaturated polymer may be substituted for the step of scrubbing with an inert gas.

Inasmuch as the conditions utilized in my process resemble what might be called "alkylation conditions," it is of importance that where a solvent is used, that it should not contain any large amount of isoparaffins, especially the light isoparaffins, isobutane and isopentane. Were appreciable amounts of light isoparaffins present with the hydrofluoric acid at the point of olefin monomer introduction, alkylation would set in as a competing reaction. For this reason, as discussed herein, inert solvents such as the normal paraffin are used. In continuous operation, this produces a distinction in the preferred mode of operation over that utilized in the conventional continuous alkylation process. Since the saturated product formed from the olefin polymers contains branched chain hydrocarbons (the nature of which depending upon the particular olefin being processed) I prefer not to recirculate the product mixture to the point of olefin introduction in order to avoid alkylation of isoparaffinic polymer products. One way of accomplishing this is shown in the drawing, wherein the initial olefin addition is to product-free acid, and the additional contacting at the longer residence time is effected in a separate reactor. This does not mean that all or part of the product mixture could not be recirculated and the olefin introduced into the product-acid emulsion, since any alkylation that occurs does no harm, but merely increases the amount of heavier saturated hydrocarbons formed. Also, the isoparaffins initially formed are largely those of six or more carbon atoms (depending upon the olefin and the extent of polymerization).

For the purpose of further illustrating the invention, the following examples are given for the conjunct polymerization of propylene, it is to be understood that the invention is not to be limited by the specific details thereof as there may be variations therefrom without departing from the scope of the invention.

*Example 1*

632 parts of propylene (5% propane) by weight were added to 910 parts by weight of thoroughly agitated anhydrous hydrogen fluoride over a period of 145 minutes. The temperature of the reaction mixture was maintained at 20° C., plus or minus 3° C. After completing the addition of propylene 291 parts by weight of normal butane were added. Agitation was discontinued, and two liquid phases, i. e., the saturated hydrocarbon phase and the unsaturated hydrocarbon-hydrofluoric acid phase allowed to separate. The two phases were then separately recovered and the hydrofluoric acid and normal butane carefully distilled from the acid and hydrocarbon layers. The amount of $C_5$ plus saturated hydrocarbons in the top layer was 396 parts by weight, or 65.9% by weight of the propylene charged, while the amount of polymer products recovered from the lower layer was 207 parts by weight, or 34.4% of the propylene charged. The distribution of the hydrocarbons forming the saturated hydrocarbon product was as follows:

| Boiling pt., °C. | Weight percent of total |
| --- | --- |
| 25°–200° C. at 760 mm | 9.5 |
| 200° at 760–185° at 10 mm | 57.5 |
| 185°+ at 10 mm | 33.0 |
| | 100.0 |

The material distilling above 185° C. at 10 mm. of mercury pressure had a 100° F. Saybolt viscosity of 311 seconds, a 210° F. viscosity of 49.9 seconds, and a viscosity index of 65. Its pour point was −40° F., and its Conradson carbon residue was 0.04%.

Example 2

The procedure employed in Example 1 was repeated using the same quantities of materials except that the temperature of the reaction mixture was controlled at about 50° C. plus or minus 3° C. The products were separated and recovered as in Example 1. In this case the amount of C₅ saturated hydrocarbons recovered was 356 parts by weight or 59.2% of the propylene charged, and the amount of polymer product was 193 parts by weight, or 32.0% of the propylene charged. The distribution of the hydrocarbons forming the saturated hydrocarbon product was as follows:

| Boiling pt., °C. | Weight per cent of total product |
| --- | --- |
| 25–200° C. at 760 mm | 25.8 |
| 200° C. at 760—185° C. at 10 mm | 67.6 |
| 185° C.+ at 10 mm | 6.6 |
| | 100.0 |

Example 3

To a well agitated mixture of 297 parts of anhydrous hydrogen fluoride and 780 parts of normal butane by weight, 117 parts of propylene (5% propane) by weight were added over a period of 177 minutes. The temperature of the reaction mixture was maintained at 20° C., plus or minus 3° C. After completing the addition of propylene, agitation was discontinued, and the two liquid phases, i. e., the saturated hydrocarbon phase and the unsaturated hydrocarbon-hydrofluoric acid phase allowed to separate. The two phases were then separately recovered and the hydrofluoric acid and normal butane carefully distilled from the acid and the hydrocarbon layers. The weight of C₅+saturated hydrocarbons in the top layer was 72.5 parts by weight, or 65.3% by weight of the propylene charged, while the weight of polymer products recovered from the lower layer was 29.0 parts by weight or 26.1% of the propylene charged. The distribution of the hydrocarbons forming the saturated hydrocarbon product was as follows:

| | Wt. percent of total |
| --- | --- |
| 25°–200° C. at 760 mm | 40.3 |
| Above 200° C. at 760 mm | 59.7 |
| | 100.0 |

All of the normal butane was recovered, and there was no evidence of any having reacted with the propylene.

These three examples also illustrate the marked effect of temperature and solvent ratio on the composition of the saturated hydrocarbon product. Thus, by comparing the product from Example 1 with that from Example 3, both of which were carried out at 20° C., it will be seen that the presence of the solvent (normal butane) increased the amount of material boiling in the gasoline range by over 400 percent. Increasing the amount of inert solvent not only increases the amount of gasoline boiling hydrocarbons in the hydrocarbon layer, but also increases the relative amount of low molecular weight hydrocarbons of highly unsaturated character in the acid layer. Accordingly by the use of inert solvent and by varying the relative proportions of inert solvent to olefin utilized, the proportion of low to high molecular weight hydrocarbon products may be controlled. This consideration is general for the various olefins, propylene, butenes, pentenes, etc., and is further exemplified in my copending application Serial Number 532,490 filed April 24, 1944, covering the conjunct polymerization of olefins of four or more carbon atoms.

An increase in the temperature from 20° to 50° C., when operating in the absence of a solvent in Example 2, produced a 270 percent increase in the gasoline boiling range material and an even more marked decrease in the lubricating oil range material. Obviously, therefore, if it is desired to produce primarily the gasoline range material the process would be operated at elevated temperatures (above 20° C.) in the presence of a solvent, whereas if lubricating oil range material is desired the process would be conducted in the absence of a solvent at relatively low temperatures, e. g., from 10° to 20° C.

Since the reaction product in the acid layer is composed of a very substantial portion of terpene-like hydrocarbons, it can be appreciated readily that efficient recovery of such fraction is necessary for any practical operation. Accordingly, from the above examples, it can be seen that my process permits efficient recovery of all the reaction product, whereas prior art processes have failed to do so and because of this failure have received little attention.

The terpene-like unsaturated hydrocarbons form a valuable product having many potential uses, primarily as a raw material for the manufacture of other products. Thus, for example, this product may be steam-distilled to yield a suitable fraction that may serve as a turpentine substitute, or other solvent-type material, or the product or fraction thereof may be hydrogenated; as, for example, the non-steam-distillable residue (or vacuum-distillation residue which may be considered as an equivalent) may be hydrogenated to form material boiling in the lubricating oil range. Further, hydrocarbons of this product may be hydrogenated to aromatics, or, still further, they may be reacted with a suitable resinifying agent to form desirable resins.

Many modifications of my invention will be apparent to those skilled in the art, and therefore only such limitations should be imposed as are indicated in the appended claims.

I claim:

1. The process for the conjunct polymerization of propylene to produce saturated hydrocarbon polymers and terpene-like unsaturated hydrocarbons which comprises contacting the mono-olefin with a catalyst consisting essentially of hydrofluoric acid of about 90 to 100% concentration, correlating the amount of hydrofluoric acid, the reaction temperature and time to effect polymerization of propylene as the principal reaction of the process and allow hydrogen exchange between the propylene polymers to occur to form saturated hydrocarbon material and a highly unsaturated hydrocarbon material, separating the reaction mixture into an acid phase and a hydrocarbon phase, recovering saturated hydrocarbons heavier than propane from the hydrocarbon phase, and terpene-like unsaturated hydrocarbons from the acid phase.

2. A process for the polymerization of propylene which comprises adding from about 16⅔ to about 500 parts of propylene to about 100 parts by weight of essentially anhydrous hydrofluoric acid as a catalytic agent at a temperature of from about +10° C. to about +200° C. at a rate such that the relative proportion by weight of propylene monomer in the reaction mixture is less than that of the hydrofluoric acid, agitating the resulting mixture for a period of time sufficient to allow the saturation of a considerable proportion of the propylene polymers to occur, separating the hydrocarbon phase containing the saturated hydrocarbons from the acid catalyst phase containing highly unsaturated polymer material, and separately recovering the hydrocarbons from each of said phases.

3. A process for the polymerization of propylene which comprises adding from about 16⅔ to about 500 parts of propylene to about 100 parts by weight of essentially anhydrous hydrofluoric acid as a catalytic agent at a temperature of from about +10° C. to 60° C. at a rate such that the relative proportion by weight of propylene monomer in the reaction mixture is less than that of the hydrofluoric acid, agitating the resulting mixture for from about 30 minutes to about 180 minutes to allow saturation of a considerable portion of the propylene polymers to occur, separating the hydrocarbon phase containing the saturated hydrocarbons from the acid catalyst phase containing highly unsaturated polymer material, and separately recovering the hydrocarbons from each of said phases.

4. A process for the polymerization of propylene which comprises adding from about 16⅔ to about 200 parts of propylene to a mixture of about 100 parts by weight of essentially anhydrous hydrofluoric acid and at least as much of a normal paraffin hydrocarbon as acid at a temperature of from about +10° C. to about +60° C. at a rate such that the ratio of acid to propylene monomer is at least 5 to 1, allowing the hydrocarbons to remain in contact with the acid catalyst for a residence time sufficient to effect polymerization of propylene as the principal reaction of the process and allow hydrogen exchange between the primary polymers to occur to form saturated hydrocarbon material and a highly unsaturated hydrocarbon material, separating the reaction mixture into an acid phase and a hydrocarbon phase, recovering saturated hydrocarbons heavier than propane from the hydrocarbon phase, and terpene-like unsaturated hydrocarbons from the acid phase.

5. In a process for the polymerization of propylene to produce saturated hydrocarbons and terpene-like unsaturated hydrocarbons the steps of (1) introducing the propylene monomer into a liquid mixture of a normal paraffin hydrocarbon and hydrofluoric acid maintained at a temperature of between about 10° and 200° C. at a rate such that the amount of propylene monomer by weight at any time is less than one-tenth the amount of hydrofluoric acid, (2) transferring the mixture of primary polymerization products and acid catalyst to a reaction zone wherein the mixture is agitated and maintained at a temperature of between about 10° and 200° C. and allowing further contacting of the acid catalyst and propylene including primary polymerization products to occur during a residence time sufficient to allow substantial saturation of acid immiscible propylene polymers, (3) withdrawing reaction mixture containing hydrofluoric acid and hydrocarbons including propylene reaction products and any unreacted propylene monomer from said reaction zone, (4) passing the mixture so withdrawn to a separation zone for separation into a lower acid phase and an upper hydrocarbon phase, (5) withdrawing the acid phase and vaporizing hydrofluoric acid from the terpene-like unsaturated hydrocarbons therein, (6) condensing and returning at least part of the hydrofluoric acid to the point of said propylene introduction, and (7) withdrawing the hydrocarbon phase and recovering predominantly saturated C₅ plus hydrocarbon product therefrom.

6. In a process for the polymerization of propylene to produce saturated hydrocarbons and terpene-like unsaturated hydrocarbons the steps of (1) introducing the propylene monomer into a liquid mixture of a normal paraffin hydrocarbon and hydrofluoric acid maintained at a temperature of between about 10° and 60° C. at a rate such that the amount of propylene monomer by weight at any time is less than one-tenth the amount of hydrofluoric acid, (2) transferring the mixture of primary polymerization products and acid catalyst to a reaction zone wherein the mixture is agitated and maintained at a temperature of between about 10° C. and 60° C. for a residence time of from 30 to 180 minutes, (3) withdrawing reaction mixture containing hydrofluoric acid and hydrocarbons including propylene reaction products and any unreacted propylene monomer from said reaction zone, (4) passing the mixture so withdrawn to a separation zone for separation into a lower acid phase and an upper hydrocarbon phase, (5) withdrawing the acid phase and vaporizing hydrofluoric acid from the terpene-like unsaturated hydrocarbons therein, (6) condensing and returning at least part of the hydrofluoric acid to the point of said propylene introduction, and (7) withdrawing the hydrocarbon phase and recovering predominantly saturated C₅ plus hydrocarbon products therefrom.

7. A process for the conjunct polymerization of propylene to produce saturated hydrocarbon polymers and terpene-like unsaturated hydrocarbons which comprises contacting the propylene in admixture with a solvent for saturated hydrocarbons with a catalyst consisting essentially of hydrofluoric acid of about 90 to 100 percent concentration at a temperature of from about 10° C. to 200° C., separating the reaction mixture into two phases, recovering the hydrocarbon phase containing the saturated hydrocarbon polymers, vaporizing the hydrofluoric acid from the catalyst phase and recovering the terpene-like unsaturated hydrocarbons remaining after removal of the hydrofluoric acid.

8. A process for the production of paraffinic hydrocarbons from propylene which comprises adding about 16⅔ to about 200 parts by weight of propylene to a mixture essentially consisting of about 100 parts of essentially anhydrous hydrofluoric acid as a catalytic agent and at least an equal amount of a normal paraffin at a temperature between about 10° and about 200° C. at a rate such that the relative proportion by weight of propylene in the mixture is less than that of the hydrofluoric acid to effect polymerization of the propylene, agitating the resulting mixture for a period of time sufficient to allow saturation of a major proportion of the polymer products to occur to form acid immiscible paraffinic hydrocarbons therefrom, separating and recovering the paraffinic hydrocarbon products from the acid catalyst.

CARL S. KUHN, Jr.